(12) United States Patent
Sebes et al.

(10) Patent No.: US 7,856,661 B1
(45) Date of Patent: Dec. 21, 2010

(54) CLASSIFICATION OF SOFTWARE ON NETWORKED SYSTEMS

(75) Inventors: E. John Sebes, Menlo Park, CA (US); Rishi Bhargava, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 1307 days.

(21) Appl. No.: 11/182,320

(22) Filed: Jul. 14, 2005

(51) Int. Cl.
*G06F 12/14* (2006.01)

(52) U.S. Cl. .............................. 726/22; 726/23; 726/24; 713/176; 713/188

(58) Field of Classification Search ............. 726/22–24; 713/188, 176; 717/172
See application file for complete search history.

(56) References Cited

U.S. PATENT DOCUMENTS

| | | | |
|---|---|---|---|
| 4,688,169 A | 8/1987 | Joshi | 364/200 |
| 4,982,430 A | 1/1991 | Frezza et al. | 380/50 |
| 5,155,847 A | 10/1992 | Kirouac et al. | |
| 5,222,134 A | 6/1993 | Waite et al. | 380/4 |
| 5,390,314 A | 2/1995 | Swanson | 395/500 |
| 5,521,849 A | 5/1996 | Adelson et al. | 364/570 |
| 5,560,008 A | 9/1996 | Johnson et al. | 395/650 |
| 5,699,513 A | 12/1997 | Feigen et al. | 395/187.01 |
| 5,778,349 A | 7/1998 | Okonogi | 707/1 |
| 5,787,427 A | 7/1998 | Benantar et al. | |
| 5,842,017 A | 11/1998 | Hookway et al. | 395/707 |
| 5,907,709 A | 5/1999 | Cantey et al. | 395/705 |
| 6,141,698 A | 10/2000 | Krishnan et al. | |
| 6,192,401 B1 | 2/2001 | Modiri et al. | |
| 6,275,938 B1 | 8/2001 | Bond et al. | 713/200 |
| 6,338,149 B1 | 1/2002 | Ciccone, Jr. et al. | 714/38 |
| 6,356,957 B2 | 3/2002 | Sanchez, II et al. | 709/328 |
| 6,393,465 B2 | 5/2002 | Leeds | 709/207 |
| 6,442,686 B1 | 8/2002 | McArdle et al. | 713/151 |
| 6,453,468 B1 | 9/2002 | D'Souza | |
| 6,587,877 B1 | 7/2003 | Douglis et al. | 709/224 |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | 717/126 |

(Continued)

OTHER PUBLICATIONS

U.S. Appl. No. 12/615,521, entitled "System and Method for Preventing Data Loss Using Virtual Machine Wrapped Applications," filed Nov. 10, 2009, Inventor(s): Sonali Agarwal, et al.

(Continued)

*Primary Examiner*—Thanhnga B Truong
(74) *Attorney, Agent, or Firm*—Patent Capital Group

(57) ABSTRACT

A method and system for the classification of software in networked systems, includes: determining a software received by a sensor is attempting to execute on a computer system of the sensor; classifying the software as authorized or unauthorized to execute, and gathering information on the software by the sensor if the software is classified as unauthorized to execute. The sensor sends the information on the software to one or more actuators, which determine whether or not to act on one or more targets based on the information. If so, then the actuator sends a directive to the target(s). The target(s) updates its responses according to the directive. The classification of the software is definitive and is not based on heuristics or rules or policies and without any need to rely on any a priori information about the software.

8 Claims, 3 Drawing Sheets

U.S. PATENT DOCUMENTS

| | | | |
|---|---|---|---|
| 6,832,227 B2 | 12/2004 | Seki et al. | 707/101 |
| 6,834,301 B1 | 12/2004 | Hanchett | 709/223 |
| 6,847,993 B1 | 1/2005 | Novaes et al. | |
| 6,918,110 B2 | 7/2005 | Hundt et al. | |
| 6,930,985 B1 | 8/2005 | Rathi et al. | 370/254 |
| 6,988,101 B2 | 1/2006 | Ham et al. | 707/10 |
| 6,988,124 B2 | 1/2006 | Douceur et al. | |
| 7,010,796 B1 | 3/2006 | Strom et al. | |
| 7,039,949 B2 | 5/2006 | Cartmell et al. | |
| 7,065,767 B2 | 6/2006 | Kambhammettu et al. | 719/310 |
| 7,082,456 B2 | 7/2006 | Mani-Meitav et al. | 709/203 |
| 7,093,239 B1 | 8/2006 | van der Made | |
| 7,124,409 B2 | 10/2006 | Davis et al. | |
| 7,139,916 B2 | 11/2006 | Billingsley et al. | 713/182 |
| 7,152,148 B2 | 12/2006 | Williams et al. | |
| 7,159,036 B2 | 1/2007 | Hinchliffe et al. | |
| 7,177,267 B2 | 2/2007 | Oliver et al. | 370/216 |
| 7,203,864 B2 | 4/2007 | Goin et al. | |
| 7,251,655 B2 | 7/2007 | Kaler et al. | 707/9 |
| 7,290,266 B2 | 10/2007 | Gladstone et al. | |
| 7,302,558 B2 | 11/2007 | Campbell et al. | 713/1 |
| 7,330,849 B2 | 2/2008 | Gerasoulis et al. | |
| 7,350,204 B2 * | 3/2008 | Lambert et al. | 717/172 |
| 7,353,501 B2 | 4/2008 | Tang et al. | |
| 7,363,022 B2 | 4/2008 | Whelan et al. | 455/411 |
| 7,370,360 B2 | 5/2008 | van der Made | |
| 7,406,517 B2 | 7/2008 | Hunt et al. | |
| 7,441,265 B2 | 10/2008 | Staamann et al. | |
| 7,464,408 B1 | 12/2008 | Shah et al. | |
| 7,506,170 B2 | 3/2009 | Finnegan | |
| 7,607,170 B2 | 10/2009 | Chesla | |
| 7,657,599 B2 | 2/2010 | Smith | |
| 7,698,744 B2 | 4/2010 | Fanton et al. | |
| 2002/0099671 A1 | 7/2002 | Mastin Crosbie et al. | 705/500 |
| 2003/0073894 A1 | 4/2003 | Chiang et al. | 600/407 |
| 2003/0074552 A1 | 4/2003 | Olkin et al. | 713/150 |
| 2003/0120601 A1 | 6/2003 | Ouye et al. | |
| 2003/0120811 A1 | 6/2003 | Hanson et al. | 709/245 |
| 2003/0120935 A1 | 6/2003 | Teal et al. | 713/188 |
| 2004/0003258 A1 | 1/2004 | Billingsley et al. | |
| 2004/0015554 A1 | 1/2004 | Wilson | 709/206 |
| 2004/0051736 A1 | 3/2004 | Daniell | 345/752 |
| 2004/0054928 A1 * | 3/2004 | Hall | 726/23 |
| 2004/0143749 A1 | 7/2004 | Tajalli et al. | |
| 2004/0167906 A1 | 8/2004 | Smith et al. | |
| 2004/0230963 A1 | 11/2004 | Rothman et al. | 717/168 |
| 2004/0255161 A1 | 12/2004 | Cavanaugh | 713/201 |
| 2005/0018651 A1 | 1/2005 | Yan et al. | 370/352 |
| 2005/0108562 A1 | 5/2005 | Khazan et al. | |
| 2005/0114672 A1 | 5/2005 | Duncan et al. | |
| 2005/0228990 A1 | 10/2005 | Kato et al. | 713/167 |
| 2005/0262558 A1 | 11/2005 | Usov | |
| 2005/0273858 A1 | 12/2005 | Zadok et al. | |
| 2006/0015501 A1 | 1/2006 | Sanamrad et al. | |
| 2006/0080656 A1 | 4/2006 | Cain et al. | |
| 2006/0236398 A1 | 10/2006 | Trakic et al. | |
| 2007/0039049 A1 | 2/2007 | Kupferman et al. | |
| 2007/0083522 A1 | 4/2007 | Nord et al. | |
| 2007/0101435 A1 | 5/2007 | Onanka et al. | |

OTHER PUBLICATIONS

Desktop Management and Control, Website: http://www.vmware.com/solutions/desktop/, Retrieved and printed Oct. 12, 2009, 1 page.

Secure Mobile Computing, Website: http://www.vmware.com/solutions/desktop/mobile.html, Retrieved and printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al.

U.S. Appl. No. 12/640,098, entitled "Enforcing Alignment of Approved Changes and Deployed Changes in the Software Change Life-Cycle," filed Dec. 17, 2009, Inventor(s): Rahul Roy-Chowdhury, et al.

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," Filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," Informit, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/551,673, entitled "Piracy Prevention Using Unique Module Translation," filed Sep. 1, 2009, Inventor(s): E. John Sebes et al.

U.S. Appl. No. 12/839,856, entitled "Containment of Network Communication," filed Jul. 20, 2010, Inventor(s) E. John Sebes, et al.

* cited by examiner

CLASSIFICATION OF SOFTWARE ON NETWORKED SYSTEMS

BACKGROUND

1. Field

The present invention relates generally to computer systems, and in particular to protecting computer systems from unauthorized software.

2. Related Art

The set of software available for execution on a computer is generally dynamic and modifiable, even when such modification is not desirable. To restrict the ability of users or administrators of a computer to install and remove software or to modify configuration of the existing software, a filter is often used to manage software access to the computer from a network. However, the filtering is based on the behavior of the software or a set of rules or policies. Filtering in this manner is inefficient and limited in reliability, as malicious software often disguises its behavior or is specifically created to traverse the rules.

Accordingly, there is a need for a method and system for the classification of software on networked systems. The method and system should definitively determine the authority of software to execute on a computing system, rather than on heuristics or rules or policies. The present invention addresses such a need.

SUMMARY

A method and system for the classification of software on networked systems, includes: determining a software received by a sensor is attempting to execute on a computer system of the sensor, classifying the software as authorized or unauthorized to execute, and gathering information on the software by the sensor if the software is classified as unauthorized to execute. The sensor sends the information on the software to one or more actuators, which determine whether or not to act on one or more targets based on the information. If so, then the actuator sends a directive to the target(s). The target(s) updates its responses according to the directive. The classification of the software is definitive and is not based on heuristics or rules or policies and without any need to rely on any a priori information about the software.

DETAILED DESCRIPTION

Glossary

Figure 1:
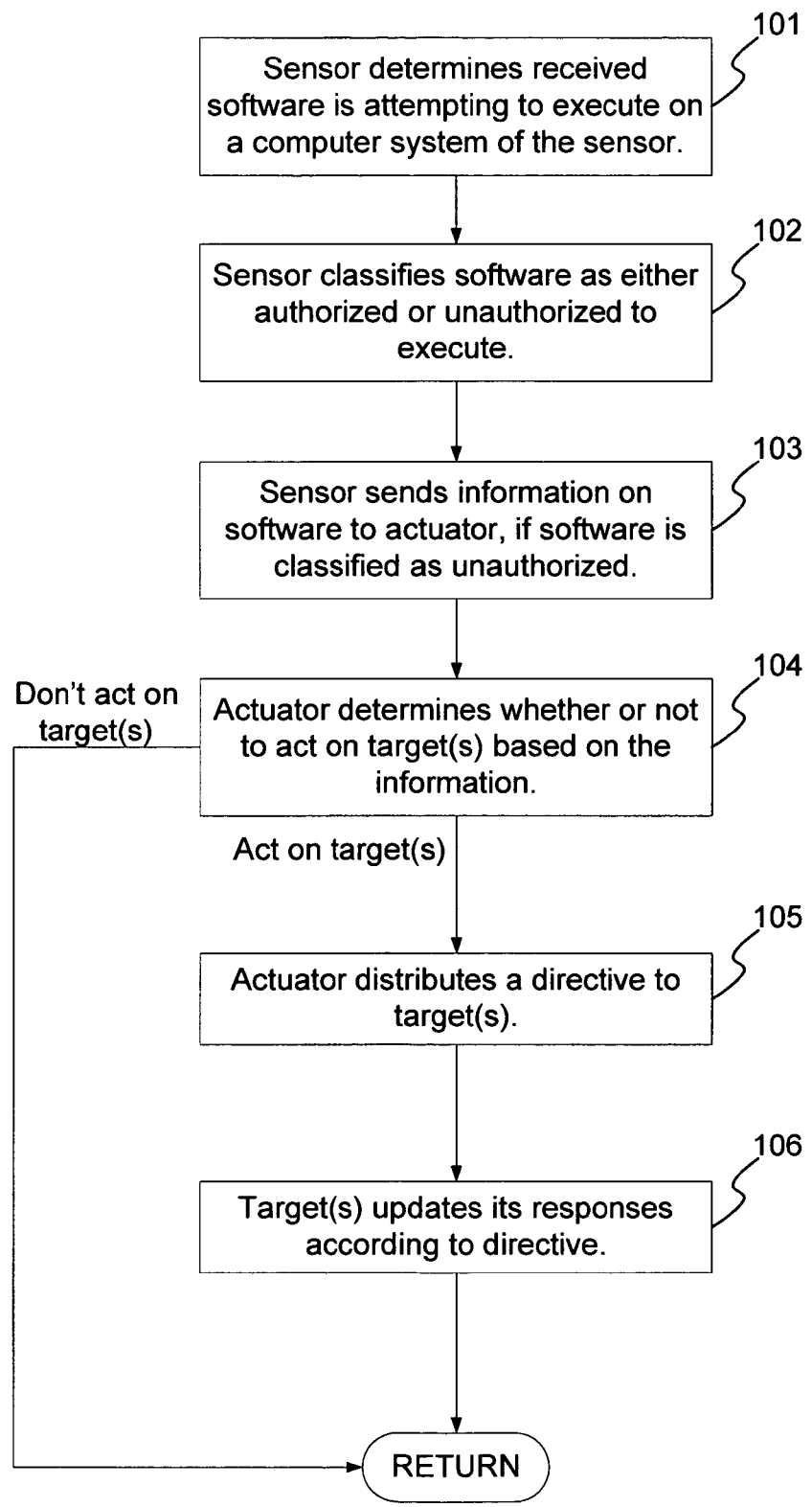
FIG. 1 is a flowchart illustrating a preferred embodiment of a method for the classification of software in accordance with the present invention.

Computing system (hereinafter also referred to as a computer): any system serving as a computing machine and capable of network communication some or all of the time. Example computing systems are workstations, servers and server groups, clusters of computers, personal computers (PCs), embedded systems, networked consoles such as travel reservation consoles, networked kiosks such as automated teller machines (ATMs), mobile or wireless devices, set-top boxes, or any other computing hardware that can send and/or receive data or otherwise communicate via one or more network nodes.

Network-Node: any computing system behaves as a Network-Node when it acts as a facilitator of network communication between two or more computing systems. Example Network-Nodes are routers, switches, hardware or software firewalls, intrusion prevention systems, intrusion detection systems, and any other computing system facilitating network communication.

End-System: any computing system behaves as an End-System when it can communicate with other computing systems via one or more Network-Nodes in a network. In a network topology represented by a graph, an End-System is typically represented by a "leaf" whereas a Network-Node is generally a non-leaf internal vertex. Though not typical, a computing system that behaves as an End-System may also behave as a Network-Node, for example by performing some amount of routing.

Sensor: a computing system behaves as a Sensor when it collects information about software that attempts execution on that computing system. A Sensor can be an End-System or a Network-Node.

Actuator: a computing system behaves as an Actuator when it receives information from one or more Sensors and can act or not act upon one or more Targets (as defined below) based on an examination of the received information. As presented herein, an Actuator uses information supplied by Sensors in a network in order to assess any potential effects of software that is traveling within the network, and in response to act upon one or more Targets in an attempt to contain the effects, to deny further entry of such software into the network, to further study the propagation or other behavior of such software in the network, and/or to perform any other tasks relevant to identifying and blocking unauthorized software on networked systems.

Target: a computing system behaves as a Target when it comprises a functionality or mechanism by which it can be acted upon by an Actuator. An example Target is a Network-Node that can restrict network traffic based on directives or information received from an Actuator.

Source: a computing system behaves as a Source when it is a point of origin (or transition) for a piece of software that is traveling via a network from the Source to a Target. A Source can be an End-System or a Network-Node.

Destination: a computing system behaves as a Destination when it represents a potential destination for software originating from (or transitioning through) a Source. A Destination represents a computing system on which such software may attempt to execute some time after arrival, or from which such software may attempt to travel or propagate to other Destinations (in which case the Destination behaves also as a Source of that software).

Manager: a computing system behaves as a Manager when it manages software on one or more other computing systems. Example Managers are computing systems that update virus or malware definitions on other computing systems which have anti-virus or anti-malware software installed, computing systems that install software patches on other computing systems, computing systems that update software firewall rules on other computing systems that have a software firewall installed, etc.

DESCRIPTION

A Sensor classifies pieces of software that attempt to execute on the Sensor (i.e. attempt to execute on the Sensor's underlying computing system) as either authorized to execute on the Sensor or not authorized to execute on the Sensor, and sends data relating to unauthorized pieces of software to one or more Actuators. An Actuator analyzes the data and generates directives for Targets, thereby influencing the Targets' behavior in an attempt to mitigate potentially harmful effects of such unauthorized software.

In one embodiment, the Sensor has a set of identifiers for identifying a set of software that the Sensor considers authorized to execute on the Sensor, and considers any piece of software that is not a member of this set of authorized software as unauthorized. This represents a definitive classification of all known and unknown software, without any need to rely on any a priori information about software that is considered unauthorized.

In order for a Sensor to classify a piece of software that is attempting execution, the Sensor intercepts the software's attempt at execution and examines (partially or completely) the set of bits constituting the software.

The execution interception can be achieved in a number of ways. In one embodiment, the Sensor uses an operating system (OS)-provided application programming interface (API) to specify to the OS a "white list" of pieces of software considered authorized by the Sensor (such as an API provided by the Solaris™ OS for this purpose) and requests notification by the OS of execution attempts of unauthorized pieces of software (i.e. any software not on the "white list"). In another embodiment, the Sensor intercepts the OS's mechanism of receiving a request to execute a piece of software, or other APIs provided by the OS, and prior or after the execution of the software determines whether the piece of software is authorized or not. This approach allows recognition of code that travels through a network and attempts execution on a computing system (such as an email attachment or a downloaded piece of code) and allows recognition of code that is injected into a running process (such as in a buffer overflow attack). Such capabilities are described in more detail in co-pending U.S. patent application entitled "Damage Containment by Translation", Ser. No. 10/651,588, filed on Aug. 29, 2003, and in co-pending U.S. patent application entitled "Method and system for containment of Usage of Language Interfaces", Ser. No. 10/739,230, filed on Dec. 17, 2003, both assigned to the assignee of the present application. Applicant hereby incorporates these patent applications by reference.

The determination of whether a piece of software attempting execution is authorized to execute on a Sensor or not can also be done in a number of ways. One approach is for the Sensor to generate an identifier for the piece of software and check whether the generated identifier is a member of a set of identifiers ("authorized identifiers") representing pieces of software authorized to execute on the Sensor. For example, an identifier may be any form of hash, checksum or message digest (e.g. a function from the Secure Hash Algorithm (SHA) family of cryptographic hash functions, the Message Digest algorithm 5 hash function, etc.) evaluated on all or part of the set of bits representing the piece of software, in which case the Sensor will have a set of hash or checksum or message digest values representing authorized identifiers. An identifier may be an OS file name of the piece of software attempting execution, in which case the Sensor will have a set of OS file names representing authorized identifiers (i.e. files authorized to execute on the Sensor). An identifier may be an OS file system internal designator (such as an inode), in which case the Sensor will have a set of corresponding OS file system internal designators representing authorized identifiers. An identifier may be an OS or file system attribute or meta-data. In general, the Sensor may use any combination of the above example identifiers, or any other identifier which can be generated for a piece of software that is attempting execution and compared against a set of corresponding authorized identifiers in order to classify the piece of software as authorized or unauthorized to execute.

In another complimentary approach, a piece of software may already be executing on the computing system of the Sensor, and the Sensor may determine that the piece of software is actually unauthorized to execute based on a specific API access attempted by the piece of software. This is described in more detail in the above referenced co-pending U.S. patent application Ser. Nos. 10/651,588 and 10/739,230, and in the co-pending U.S. patent application entitled "Solidifying the Executable Software Set of a Computer", Ser. No. 10/935,772, filed on Sep. 7, 2004. Applicant hereby incorporates patent application Ser. No. 10/935,772 by reference.

Optionally, a Sensor may be "solidified" in which case it can determine whether a piece of software that is attempting execution is authorized or not, and can also proactively block such unauthorized execution. The "solidification" of a computing system is described in more detail in the above referenced co-pending U.S. patent application Ser. No. 10/935,772

Once a Sensor classifies a piece of software as unauthorized to execute, the Sensor prepares data about the particular execution attempt of the piece of software, collects any ancillary data that may be relevant to an Actuator for analyzing the execution attempt and generating related directives for Targets, and sends this data to one or more Actuators. There are several examples of such ancillary data. As an example, for a piece of unauthorized software which arrives via a network, the Sensor can send one or more network packets which encoded the piece of software. The Sensor can indicate the source and destination IP address and ports, a packet payload signature and/or packet header signature (hash or checksum or message digest), etc. since this information can be useful to Targets that can recognize and possibly filter out such packets in the future. Example Targets include network level pattern matching and packet filtering elements such as packet filters, intrusion detection systems or intrusion prevention systems. The Sensor may correlate network packets with the unauthorized software by time of execution attempt, by matching a checksum of the software with a checksum of a pattern in a network packet, or by any other information available to the Sensor that could be correlated with the unauthorized software and serve as potentially useful information for one or more appropriate Targets for the purpose of identifying or blocking other instances (copies) of the software. The Sensor may keep a set of recent network packets for this purpose. As another example of such ancillary data, for a piece of software that attempts execution and is identified as unauthorized via a checksum comparison, the Sensor can send the checksum of the software to an Actuator, since this information can be useful to those Targets types (such as email servers, file transfer servers, internet proxies, etc.) that can recognize and possibly filter out pieces of software (such as email attachments, files, browser downloads, etc.) based on checksums or other similar functions.

The power of the present approach to classify software on networked computing system stems in part from the following two facts:
  (a) A Sensor provides definitive, accurate, real-time classification of software as unauthorized to execute on the Sensor. This information is definite and not a guess based on heuristics or rules or policies, in contrast with intrusion detection or intrusion prevention systems that rely on rules and heuristics. This information is not dependent on a priori knowledge about the specific software itself, in contrast with other approaches that use a prior information about unauthorized software in order to identify such software, such as anti-virus systems depending on virus signatures requiring updates.

(b) A Sensor provides data on such unauthorized software to an Actuator which in turn can act on one or more Targets in a network in order to mitigate the effects of such unauthorized software.

FIG. 1 is a flowchart illustrating a preferred embodiment of a method for the classification of software in accordance with the present invention. First, a Sensor determines that received software is attempting to execute on the computing system of the Sensor, via step 101. The Sensor then classifies the software as either authorized or unauthorized to execute on the computing system, via step 102. If the software is unauthorized to execute, the Sensor sends information on the software to an Actuator, via step 103. The information can be sent in the form of a log, a report, or a response to a poll initiated by the Actuator. As described above, this information is definite and not a guess based on heuristics or rules or policies nor dependent on a priori knowledge on the specific software itself. Based on the information, the Actuator determines whether or not to act on a Target, via step 104. Here, the Actuator examines the information as input and outputs a directive that is actionable by a Target. If the Actuator decides to act on a Target, the directive of the examination is distributed to the Target, via step 105. The Target then updates it responses according to the directive, via step 106.

An Actuator's examination of Sensor-provided information and any resulting actions on Targets (i.e. directives or instructions sent to Targets) generally proceeds as follows:

(a) Collation: The Actuator collates one or more pieces of Sensor-provided data comprising information about one or more execution attempt instances of an unauthorized piece of software (which may be potentially harmful or malicious). The pieces of data are provided by one or more Sensors and at one or more points in time, as described above.

(b) Determining information that can be used to identify potentially malicious software: The Actuator examines the collated data and determines what subset (if any) of the data can represent a useful identifier of the corresponding unauthorized piece of software that initiated the provision of such data by a Sensor in the first place. Broadly, such an identifier is generally useful for an element of a network (such as Network-Nodes, intrusion prevention/detection systems, packet filters, etc.), for an element of an OS file system, or for an element of an OS's memory subsystem (such as stack pattern checkers, performance monitoring systems, etc.). For example, if a piece of unauthorized software that attempts execution on a Sensor is a Perl script, the Actuator may choose to use as an identifier the string "M/bin/perl" to be matched by a Network-Node Target in order to restrict or fully block propagation of Perl scripts through a network, or to be matched by a Target's OS file system against the first few bytes of any piece of software that attempts execution in order to prevent Perl scripts from executing on the Targets. Other examples were described above.

(c) Identification of a particular Target type that can be driven by the subset of data representing the identifier. As described above, the information determined as potentially useful inherently implies such Target types that can act on such identifier information.

(d) Construction of a directive for the identified Target type, and distributing the directive to one or more identified Targets of the Target type, as described above.

Note that an Actuator may not necessarily be implemented as a monolithic system, but may optionally be represented by a set of distributed components, such as a collection component for gathering Sensor-provided data, an analyzer component for mining said data and identifying Target types and appropriate directives, and a distributor component for distributing the generated directives to one or more Targets of the identified Target type.

Note also that the notion of identification in item (b) above differs from the identification performed by a Sensor. While a Sensor uses identifiers to classify pieces of software as authorized or unauthorized to execute, and sends data about specific pieces of unauthorized software to an Actuator, an Actuator uses such Sensor-provided data to determine what (if any) subset of such data can be useful to one or more Target types for the purpose of identifying and possibly blocking such software in the future, when such software is in transit in a network or after such software arrives on a computing system connected to the network. Furthermore, note that while a Sensor's classification of a piece of software into authorized to execute versus not authorized to execute is definitive and does not rely on guesses or heuristics as described above, an Actuator's analysis of Sensor-provided information and resulting generation and distribution of actionable directives to one or more Targets may use any logic, such as heuristics, rules or policies based on best guesses, partial information, user input, historical context, etc.

Optionally, confirmation from a user can be injected at any of the illustrated steps. This user input is further described in co-pending U.S. patent application entitled, "Method and System for Containment of Networked Application Client Software By Explicit Human Input", Ser. No. 10/651,591, filed on Aug. 29, 2003, and assigned to the assignee of the present application. Applicant hereby incorporates this patent application by reference.

In one embodiment, the examination of Sensor-provided information includes an assessment of the risk involved in allowing the software to execute. For example, a Sensor can be initially configured to allow the execution of the software, but upon an examination of the information on the software by the Actuator (and optionally the assessment of the information within a context represented by other information received from one or more other Sensors), the risk may be determined to exceed a certain threshold. This result is distributed to one or more Targets, which then update their responses to block subsequent attempted executions of this software. The updates can vary in scope, in the degree of change in response, and in number of Targets to be changed. For example, if the software is received from a Source, a Target can be updated to only block subsequent attempted executions of this software received from the same Source, but a subsequent attempted execution of this software received from another Source would be allowed to execute. For another example, the block can apply only to subsequent attempted executions received from Sources within a class of IP addresses, apply to all subsequent attempted executions of the software regardless of the Source, apply to subsequent attempted executions at particular Destinations, or apply to any Destination within a class of IP addresses. For another example, the result can be sent to any number of Targets, which may or may not include the Sensor. The update can also vary among the Targets in accordance with the same result.

The change in responses of a Target can depend upon the computing environment. For example, if the Sensor is a server with a finite set of software authorized to execute, then the Sensor can be configured to block all unauthorized software from executing. However, if the Sensor is a personal computer or workstation, a user is more likely to attempt execution of harmless software that is not known or authorized to execute. In order to maintain flexibility and efficiency for the user in this context, the Sensor can be configured to allow execution of certain unauthorized software.

Figure 2:
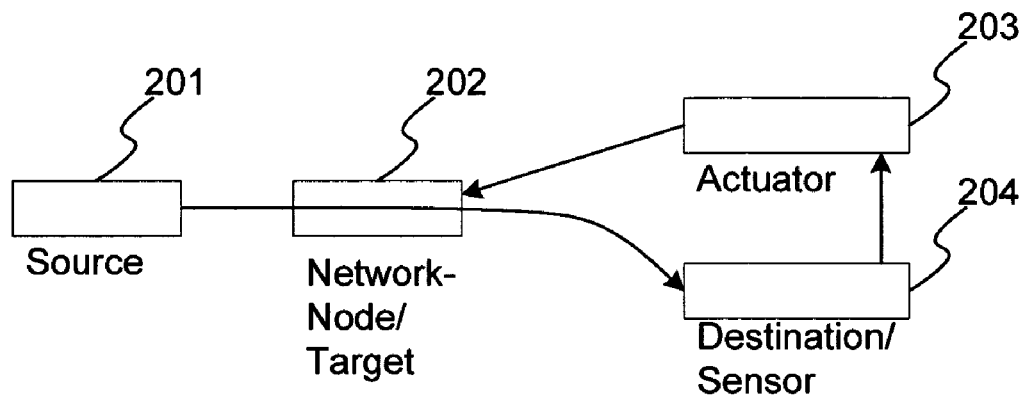
FIGS. 2 through 5 are diagrams illustrating various exemplary embodiments of a system for the classification of software in accordance with the present invention.

FIG. 2 is a diagram illustrating a first exemplary embodiment of a system for the classification of software in accordance with the present invention, comprising a Source 201, a Network-Node 202, a Sensor 204, and an Actuator 203. Here, the Sensor 204 behaves also as a Destination, and the Network-Node 202 behaves also as a Target.

Software can travel from the Source 201 through the Network-Node 202 to a Destination/Sensor 204. The Destination/Sensor 204 determines when a piece of software is attempting execution on the Destination/Sensor 204, via step 101, and classifies the piece of software as either authorized or unauthorized to execute on the Destination/Sensor 204, via step 102. If the software is classified as unauthorized to execute, the Destination/Sensor 204 sends information on the piece of software to the Actuator 203, via step 103. The information sent may comprise Source IP address and/or port and Destination IP address and/or port that constitute the channel via which the software arrived at the Destination/Sensor 204. The Actuator 203 examines the information and decides whether or not to act on the Network-Node/Target 202, via step 104. If so, then the Actuator 203 distributes a directive to the Network-Node/Target 202, via step 105. For example, the Actuator 203 may ask the Network-Node/Target 202 to restrict traffic, for example by blocking network traffic from the Source IP address and/or port to the Destination IP address and/or port, by casting a wider net such as blocking traffic from the Source IP address or a range of IP addresses regardless of port number, by blocking traffic to a port number regardless of what Source IP address it is coming from, by blocking traffic from any Source to this particular Destination, or by asking the Network-node/Target 202 to restrict traffic in any other way. The Network-Node/Target 202 then updates it responses accordingly, via step 106.

Note that in this and all other embodiments described herein, while the description generally uses a single Network-Node for brevity of explanation and conciseness of exposition, it is understood that networking may be facilitated by any number of Network-Nodes arranged in any topology or hierarchy, and accordingly that Actuators (or Managers) may choose to act on (or manage) one or more such Network-Nodes in a manner appropriate for the particular function or hierarchical position of such Network-Nodes within the set of present Network-Nodes.

Figure 3:
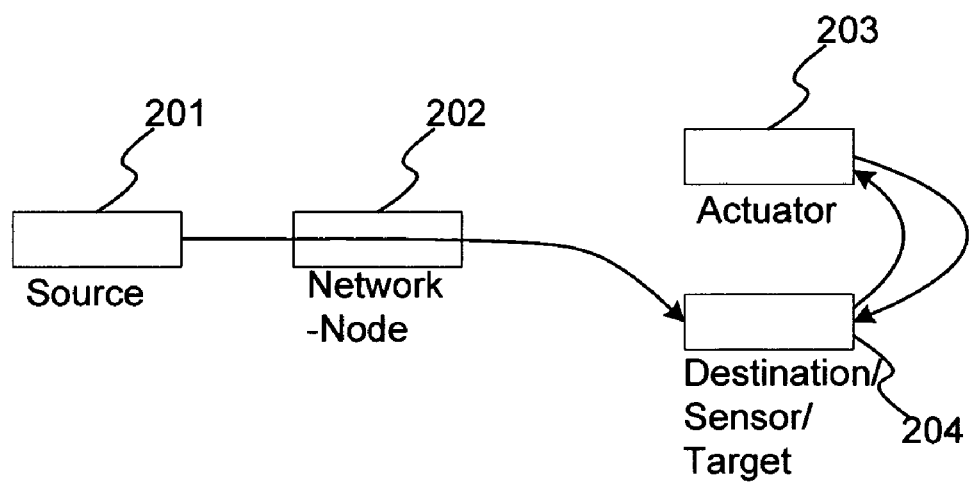

FIG. 3 is a diagram illustrating a second exemplary embodiment of the system for the classification of software in accordance with the present invention. In this embodiment, the Sensor 204 also behaves as a Destination and as a Target. Here again software can travel from the Source 201 to the Destination/Sensor/Target 204. The Destination/Sensor/Target 204 determines that software is attempting execution, via step 101, and classifies the software as either authorized or unauthorized to execute on the Destination/Sensor/Target 204, via step 102. If the software is unauthorized, the Destination/Sensor/Target 204 gathers information on the software and sends it to the Actuator 203, via step 103. The Actuator 203 examines the information and decides whether or not to act on the Destination/Sensor/Target 204, via step 104. The Actuator 203 may decide to do nothing. However, if it decides to act on the Destination/Sensor/Target 204, it sends a directive to the Destination/Sensor/Target 204, via step 105. For example, the Actuator 203 may ask the Destination/Sensor/Target 204 to block execution of this software in the future, or in the case of a solidified Destination/Sensor/Target (which would proactively block execution of such unauthorized software), may ask the Destination/Sensor/Target 204 to allow execution of this software in the future. The Destination/Sensor/Target 204 updates its responses accordingly, via step 106.

Figure 4:
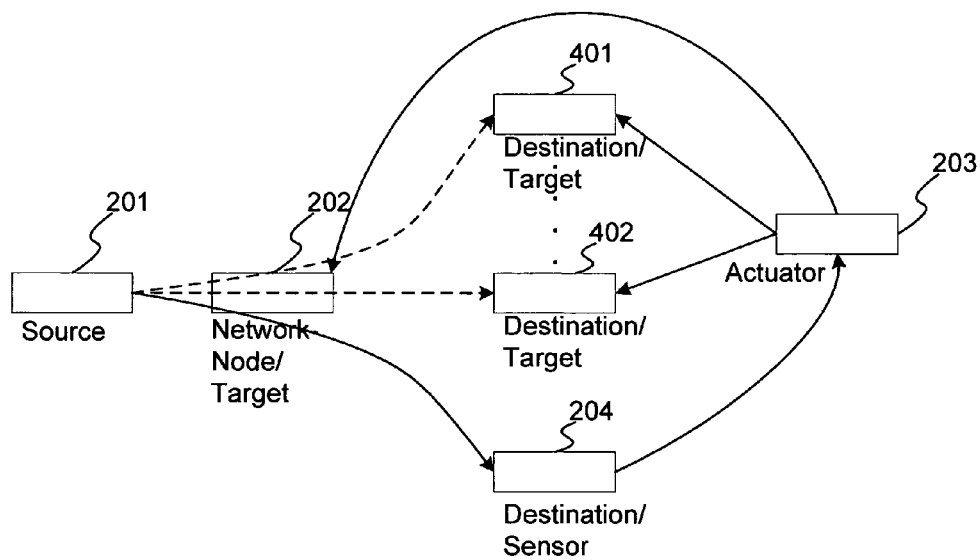

FIG. 4 illustrates a third exemplary embodiment of a system for the classification of software in accordance with the present invention. This embodiment, in addition to the components of FIG. 1, further comprises Destinations 401-402. The Network-Node 202 and the Destinations 401-402 also behave as Targets, and the Sensor 204 behaves also as a Destination.

Here again software can travel from the Source 201 to any of the Destinations 204, 401, or 402. Note that while the Destination/Sensor 204 can determine what software is attempting execution on the Destination/Sensor 204, it has no first-hand awareness of execution attempts on any other computing system and in particular on any of the other Destinations 401-402. The Destination/Sensor 204 determines when a piece of software is attempting execution on the Destination/Sensor 204, via step 101. The Destination/Sensor 204 classifies the software as either authorized or unauthorized to execute on the Destination/Sensor 204, via step 102. If the software is unauthorized, the Destination/Sensor 204 collects information on the software and sends it to the Actuator 203, via step 103. The Actuator 203 examines the information and decides whether or not to act on the Destination/Targets 401-402, via step 104. In this embodiment, the Actuator 203 can act on the Network-Node/Target 202 as described above with reference to FIG. 2, and/or on one or more of the Destination/Targets 401-402, as described above with reference to the Destination/Source/Target 204 of FIG. 3. Note that the Destination/Sensor 204 determines that the unauthorized software attempts execution on the computing system of the Destination/Sensor 204, regardless of whether a similar execution is attempted by one or more similar copies of the software on one or more of the computing systems of the Destination/Targets 401-402. Thereby, the Destination/Sensor 204 acts as a "watchdog" that notifies the Actuator 203 of unauthorized execution attempts on a representative networked computing system (in this case the Sensor's 204) among a set of computing systems (including, in this case, the Destination/Targets 401-402). The Actuator 203 can then act proactively on Destination/Targets which may or may not have experienced an attempted execution by copies of the same software, but are to be proactively protected from such executions in the future.

Figure 5:
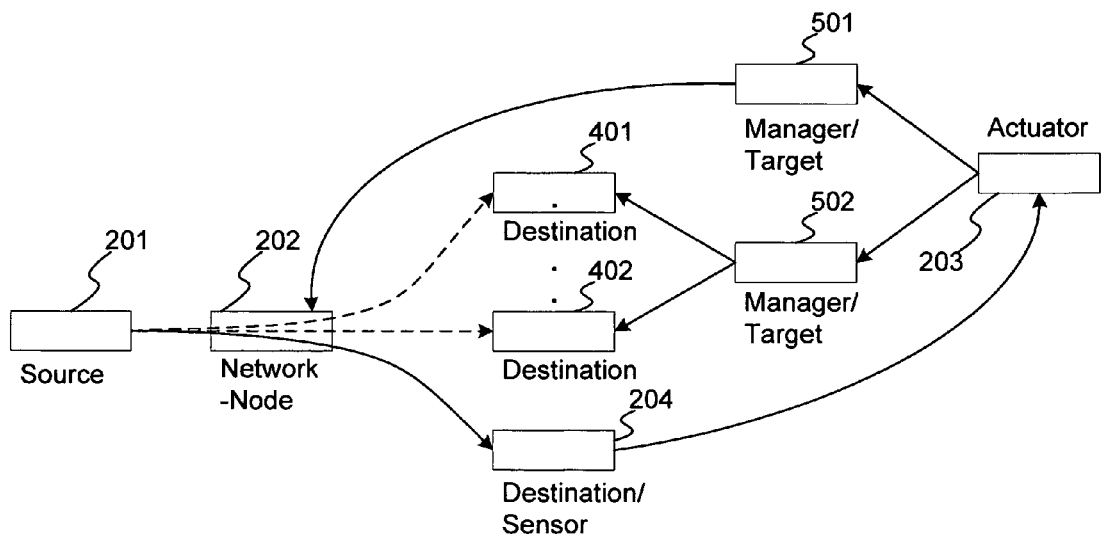

FIG. 5 is a diagram illustrating a fourth exemplary embodiment of a system for the classification of software in accordance with the present invention. This particular embodiment comprises the components illustrated in FIG. 4, except the Actuator 203 does not directly act on the Network-Node 202 or the Destinations 401-402, but instead acts through intermediary Managers 501-502 that manage the Network-Node 202 and the Destinations 401-402. Here, the Managers 501-502 also behave as Targets. One Manager 501 manages the Network-Node 202, while the other Manager 502 manages the Destinations 401-402.

Here again software can travel from the Source 201 to any of the Destinations 204, 401, or 402. The Destination/Sensor 204 determines when a piece of software is attempting execution on the Destination/Sensor 204, via step 101. The Destination/Sensor 204 classifies the software as either authorized or unauthorized to execute on the Destination/Sensor 204, via step 102. The Destination/Sensor 204 collects information on the software and sends it to the Actuator 203, via step 103. The Actuator 203 examines the information and decides whether or not to act on either of the Manager/Targets 501-502, via step 104. In this embodiment, the Actuator 203 can act on the Manager/Target 501 and cause the Manager/Target 501 to adjust the behavior of the Network-Node 202 in a manner similar to the above description of the Actuator 203 adjusting the behavior of the Network-Node 202 in FIG. 2. The Actuator 203 can also act on the Manager/Target 502 and cause the Manager/Target 502 to adjust the behavior of one or more of the Destinations 401-402 in a manner similar to the above description of the Actuator 203 adjusting the behavior of one or more of the Destination/Targets 401-402 in FIG. 4.

The embodiments in FIGS. 2-5 are exemplary only, and the described arrangements can be extended to arbitrary complexities, with any number of behaviors (Sensor, Actuator, Target, Manager, Source, Destination, Network-Node) coexisting on the same computing system and any set of interactions between the thusly behaving computing systems.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method to be executed by a processor operating in an electronic environment for classifying software in a network system, comprising:
    (a) determining a software received by a sensor is attempting to execute on a computing system of the sensor;
    (b) classifying the software as authorized or unauthorized to execute on the computing system;
    (c) gathering information on the software by the sensor and sending the information to one or more actuators for analysis and generation of a directive for one or more targets, if the software is classified as unauthorized to execute, wherein the gathering step (c) comprises:
        (c1) preparing data about the execution attempt of the unauthorized software:
        (c2) collecting ancillary data relevant to the one or more actuators for the analyzing the execution attempt and for generating directives for the one or more targets; and
        (c3) sending the ancillary data to the one or more actuators, and wherein the ancillary data comprises:
        network packets which encoded the unauthorized software;
        source and destination IP addresses and ports indicating a network connection of the network packets which encoded the unauthorized software;
        a packet payload signature or a packet header signature; or
        a checksum of the unauthorized software.

2. The method of claim 1, wherein the software is received by the sensor over a network.

3. The method of claim 1, wherein the determining step (a) comprises:
    (a1) intercepting the software's attempt at execution.

4. The method of claim 1, wherein the classifying step (b) comprises:
    (b1) generating an identifier for the software; and
    (b2) determining if the identifier is a member of a set of identifiers indicating a set of known authorized software, wherein the software is authorized to execute if the identifier is a member of the set of identifiers, wherein the software is otherwise unauthorized to execute.

5. The method of claim 4, wherein the identifier comprises a hash, checksum, or message digest evaluated on all or part of a set of bits representing the software.

6. The method of claim 1, wherein the classifying step (b) comprises:
    (b1) determining the software is attempting to access an API which it is not authorized to access; and
    (b2) classifying the software as unauthorized to execute.

7. A system comprising:
    a sensor coupled to a network system, wherein the sensor receives a software through the network system, wherein the sensor:
        determines that the received software is attempting to execute on a computing system of the sensor;
        classifies the software as authorized or unauthorized to execute on the computing system;
        gathers information on the unauthorized software and sends the information to one or more actuators for analysis and generation of a directive for one or more targets, if the software is classified as unauthorized to execute;
        prepares data about the execution attempt of the unauthorized software;
        collects ancillary data relevant to the one or more actuators for the analyzing the execution attempt and for generating directives for the one or more targets; and
        sends the ancillary data to the one or more actuators, and wherein the ancillary data comprises:
        network packets which encoded the unauthorized software;
        source and destination IP addresses and ports indicating a network connection of the network packets which encoded the unauthorized software;
        a packet payload signature or a packet header signature; or
        a checksum of the unauthorized software.

8. A computer readable medium with program instructions for classification of software in a network system, comprising instructions for a processor to execute in an electronic environment, the instructions including:
    determining a software received by a sensor is attempting to execute on a computing system of the sensor;
    classifying the software as authorized or unauthorized to execute on the computing system;
    gathering information on the software by the sensor and sending the information to one or more actuators for analysis and generation of a directive for one or more targets, if the software is classified as unauthorized to execute;
    preparing data about the execution attempt of the unauthorized software;
    collecting ancillary data relevant to the one or more actuators for the analyzing the execution attempt and for generating directives for the one or more targets; and
    sending the ancillary data to the one or more actuators, and wherein the ancillary data comprises:

network packets which encoded the unauthorized software;

source and destination IP addresses and ports indicating a network connection of the network packets which encoded the unauthorized software;

a packet payload signature or a packet header signature; or a checksum of the unauthorized software.

* * * * *